Oct. 20, 1925.　　　　　　　　　　　　　　　　　1,557,665
D. DAVIDSON
REENFORCED CONCRETE STRUCTURE
Filed Dec. 10, 1923　　　10 Sheets-Sheet 2
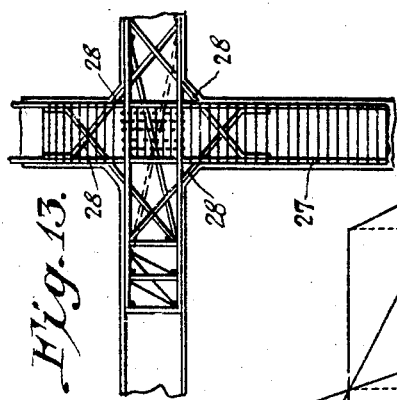
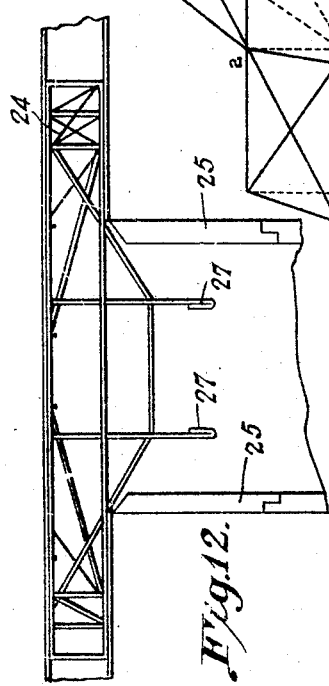
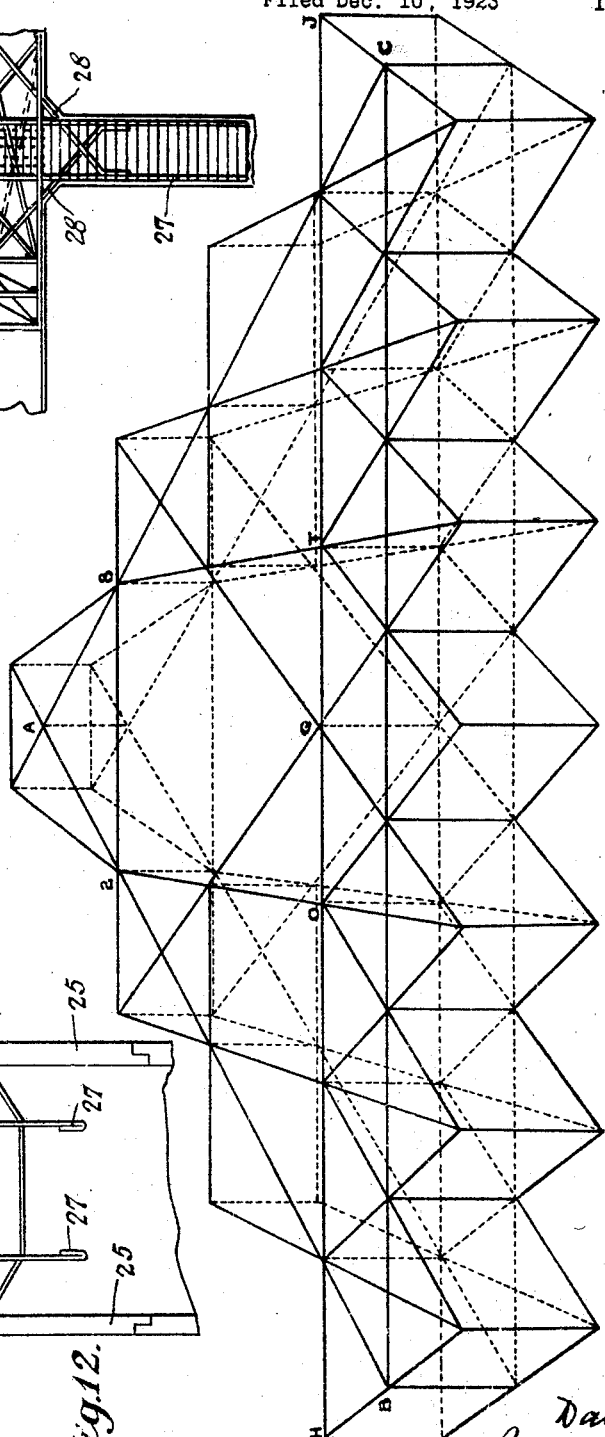

Oct. 20, 1925.
D. DAVIDSON
1,557,665
REENFORCED CONCRETE STRUCTURE
Filed Dec. 10, 1923
10 Sheets-Sheet 3
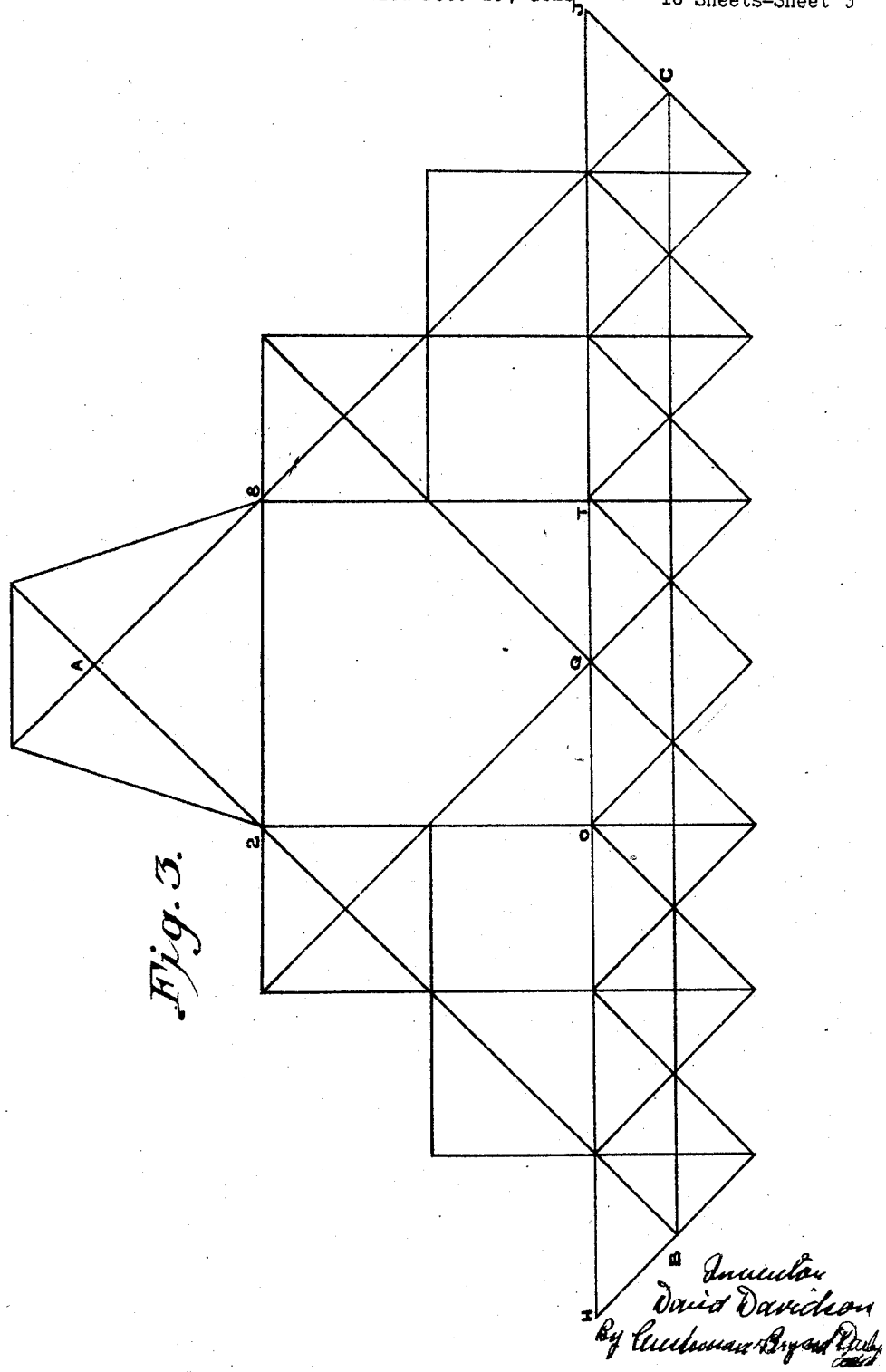

Oct. 20, 1925.

D. DAVIDSON

REENFORCED CONCRETE STRUCTURE

Filed Dec. 10, 1923 — 10 Sheets-Sheet 4

1,557,665

Oct. 20, 1925.  
D. DAVIDSON  
1,557,665  
REENFORCED CONCRETE STRUCTURE  
Filed Dec. 10, 1923 10 Sheets-Sheet 5

Oct. 20, 1925.

D. DAVIDSON

REENFORCED CONCRETE STRUCTURE

Filed Dec. 10, 1923 10 Sheets-Sheet 6

1,557,665

Oct. 20, 1925.

D. DAVIDSON 1,557,665

REENFORCED CONCRETE STRUCTURE

Filed Dec. 10, 1923  10 Sheets-Sheet 7

Inventor
David Davidson
By Cushman Bryant & Darby
attys

Oct. 20, 1925.

D. DAVIDSON 1,557,665

REENFORCED CONCRETE STRUCTURE

Filed Dec. 10, 1923 10 Sheets-Sheet 8

Oct. 20, 1925.

D. DAVIDSON 1,557,665

REENFORCED CONCRETE STRUCTURE

Filed Dec. 10, 1923 10 Sheets-Sheet 10

Patented Oct. 20, 1925.

1,557,665

UNITED STATES PATENT OFFICE.

DAVID DAVIDSON, OF LEEDS, ENGLAND.

REENFORCED CONCRETE STRUCTURE.

Application filed December 10, 1923. Serial No. 679,783.

*To all whom it may concern:*

Be it known that I, DAVID DAVIDSON, a subject of the King of Great Britain, residing at 31 Regent Park Terrace, Headingley, Leeds, in the county of York, England, have invented certain new and useful Improvements in or Relating to Reenforced Concrete Structures, of which the following is a specification.

This invention relates to reenforced concrete structures. In ordinary systems of reenforced concrete floor construction in which the floor area between column supports is carried either by main beams between the column supports or by cross beams between main beams, load increments are carried on an average two and a quarter times the shortest direct distance from load increment to supports which means two and a quarter repetitions of the span and not two and a quarter times the span. Such repetitions are multiplied when panel beams are added between cross beams. With this form of design therefore, by multiplying the load transmission route, the internal stresses are also multiplied by cumulative repetition and in consequence the strength, weight and cost of floor, and supports are multiplied by cumulative repetition of materials.

On the other hand systems which are designed to dispense with floor beam construction also considerably multiply the load transmission by adopting columns or piers of less diameter than the radiating cantilever reenforcement of the portion of the floor area surrounding the columns or piers, and considered as receiving the load transmissions from all floor panels whose corners are supported by the said columns or piers.

The present invention has for its chief object to embody in its application the principles of natural law in adopting a simple system of stress transmission routes and in providing a system of construction to ensure the synchronizing therewith of the minimum transmission routes between all load applications and their ultimate supports. In other words, the general principle on which this invention is based or founded is that the maximum effect of a load application should be transmitted directly along the shortest route to its nearest support.

According to the invention the distance between the centres of support along a span is approximately three times the width or diameter of the support along the span where the floor is not reenforced with beams; or four, or four and a half times when the floor is reenforced with say two parallel beams to a span along the shortest distance between and along the diagonals of the supports. The supports for the panels or the like may consist of four concrete filled cylinders or circular piers, the distance between the centers of which is approximately three times the overall diameter of a pier. The areas or strips of reenforcement are formed by applying on the under sides of the slabs parallel lines of reenforcement between the points of contra-flexure in the same slab and on the upper side of the slabs between the points of contra-flexure of adjacent slabs at and over a support, the width of each strip or area of reenforcement being approximately equal to or not exceeding ten per cent greater than the diameter of the support. Thus, in applying the system to floors or the like supported by octagonal piers, the strips or areas of reenforcement are equal in width to the piers, and four strips of areas of reenforcement may be arranged to span the shortest distance between the supports while two strips or areas of reenforcement may span along the diagonals between the supports. In this case, and for symmetrical and uniform loading, the four shortest flexural strips or areas of reenforcement possess the same loading, bending moments, and shearing forces, and the two diagonal flexural strips for areas of reenforcement possess the same loading, bending moments, and shearing forces.

In carrying out the invention there are round each support eight radii of maximum end-fixing bending moment passing through the centre of each support, while between these radii there are no other radii of greater maximum end bending moment, hence the interpolation of the eight maximi and integration gives the total end fixing bending moment around the perimeter of the octagonal support. The areas or strips of reenforcement have associated therewith nuclear trussed frame units for anchoring thereto the floor reenforcement wires and shear stirrups the basal framework of the upper and lower surface of each unit being respectively in the form of a triangle and a rectangle together with a member or members extending from one side of the rectangle parallel to the base of the triangle. The over-all width of the ultimate support in any given direction is adapted to receive directly within that width all load transmissions to the said support without interruption of direct stress continuity along lines at right angles to the given direction of the width of the support, the said lines in each case being in the direct line from a load application or from the element of a distributed load to the ultimate support and the said lines in each case also being the direct line from one ultimate support to the next or other adjacent ultimate supports whether diagonally across a supported area or in a direction defining the side of the supported area. The arrangement of the reenforcing bars, rods, stirrups or the like in the floor, or other area subjected to flexural stressing is such that all such bars or their equivalent pass directly from and within the width of a support directly to and within the width of the adjacent support, and in such a manner that the whole floor or other area between adjacent supports shall be entirely covered by areas of reenforcing bars or their equivalent with no unnecessary overlapping of areas of reenforcement. The trussed framed nuclear unit may be used in all panel corners defined by a support for the purpose, primarily, of forming the nucleus of the flexural end fixings and shear reenforcement framework approaching and passing over the support and of forming a rigid framework for changing incrementally the direction and quantity of reenforcement at and about the point of contraflexure. The trussed framed unit forms the elements of a rigid nucleus for the framework encircling or enclosing the reenforcement of the floor panel or other area to permit of economy, facility and efficiency in the fixing of all reenforcing bars, wires and the like, and of all shear stirrups, anchorages or their equivalent during the course of construction. The application of such a system of reenforcing results in the case of reenforced concrete floors for warehouses or factory construction, in embodying the principle of the Eiffel Tower for supports and the principle of the Forth Bridge for floors but with the spans radiating from each support; in the case of quadrilateral or rectangular floor areas in eight directions covering the whole floor area in such a manner that the widths of the bridging spans are the widths of their supports in a direction at right angles to the widths of the said spans. The trussed frame unit is applicable in the case of a floor or other panel generally subjected to loading in one direction only in which case the top surface of the frame may be rigid, with vertical members suspended rigidly or loosely, ready to receive the bottom members comprising the under surface of the frame after all the main reenforcement wires or rods are in position. The rods comprising the bottom surface of the trussed frame unit may then be laid over the floor reenforcing rods or wires which could then be pushed and held down by the bottom rods of the frame being fixed to the suspended members of the frame. In this way the difficulty of handling large coils of drawn steel wire, meshing or the like by passing same under and round the bottom surface bars of the trussed frame at and about the point of contra-flexure would be obviated.

In order that the invention may be clearly understood and readily carried into effect the same will now be more fully described with reference to the accompanying drawings in which:—

Figure 2 is a diagrammatic perspective view of the unit trussed frame referred to.

Figure 3 is a diagram showing a skeleton plan of the unit trussed frame.

Figure 12 is a sectional view taken substantially along the line 12—12 of Figure 5.

Figure 13 is a sectional view taken substantially along the line 13—13 of Figure 4.

Figure 1:
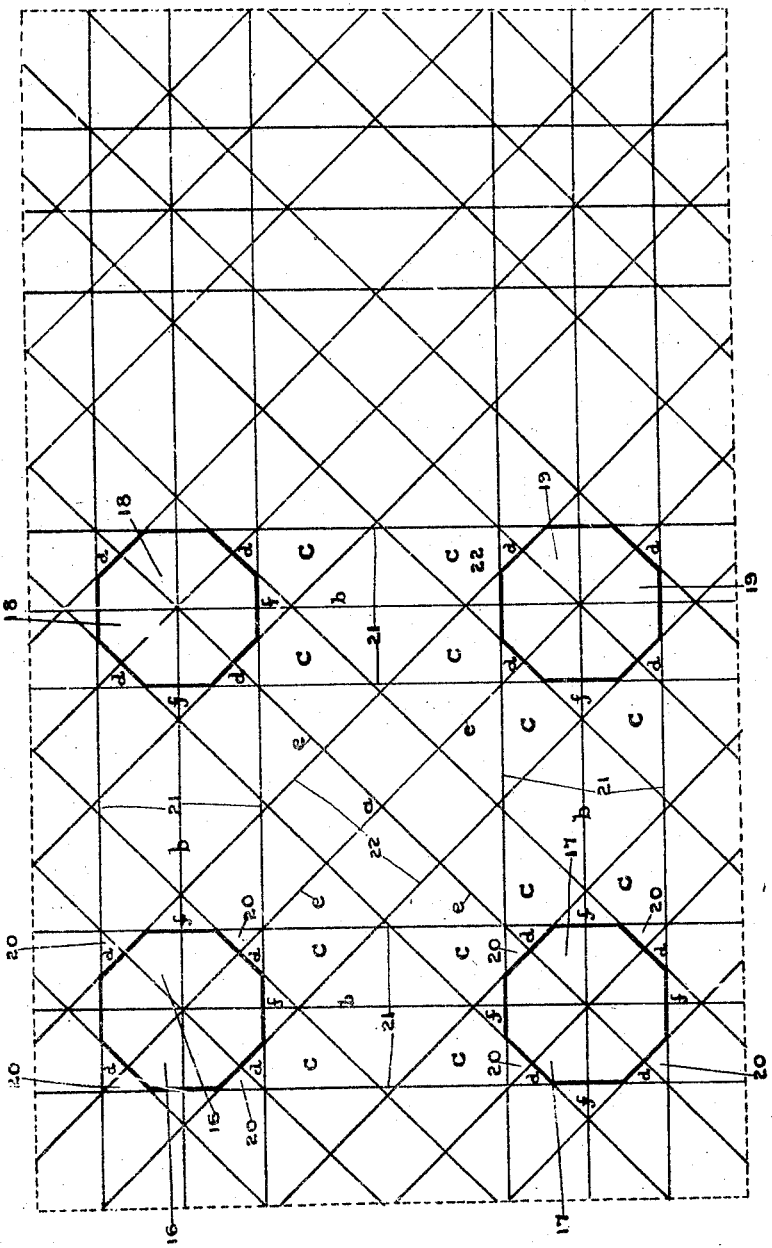
Figure 1 is a diagram illustrating the application of the invention in the case of floors with an uniformly distributed applied load.
Figure 4:
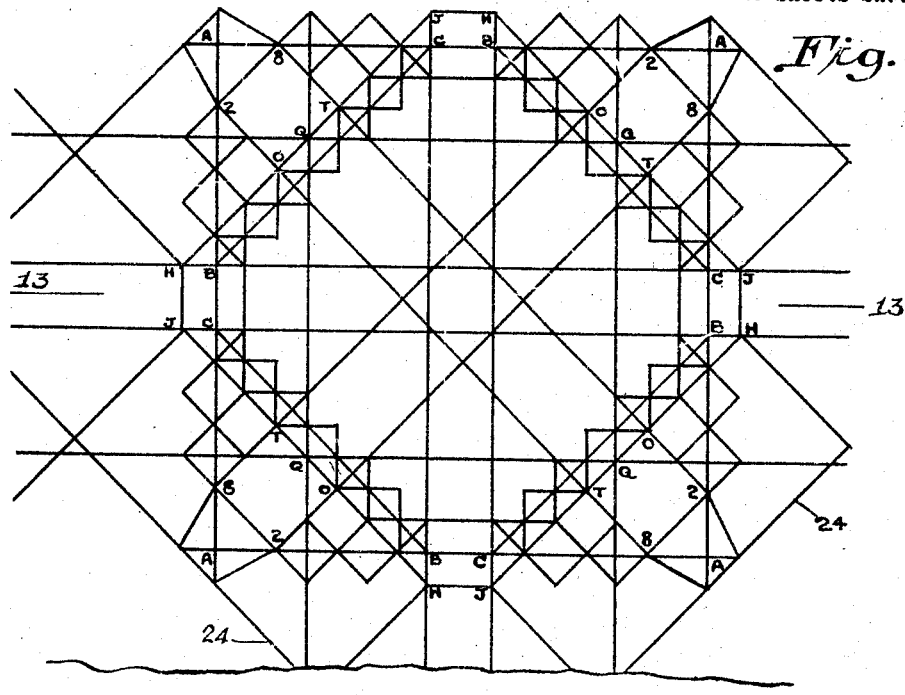
Figure 4 is a diagrammatic plan view showing the nuclear trussed frame units connected to a column or support.
Figure 5:
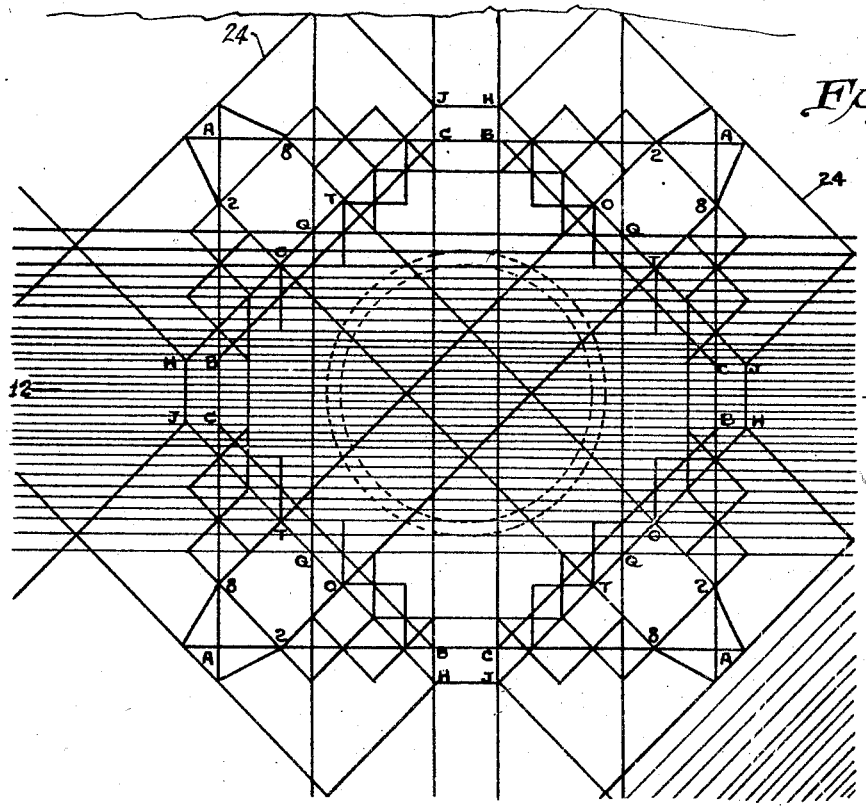
Figures 5, 6, 7, 8, 9, 10 and 11 are diagrammatic plan views of modified forms of the invention shown in Figure 4.
Figure 6:
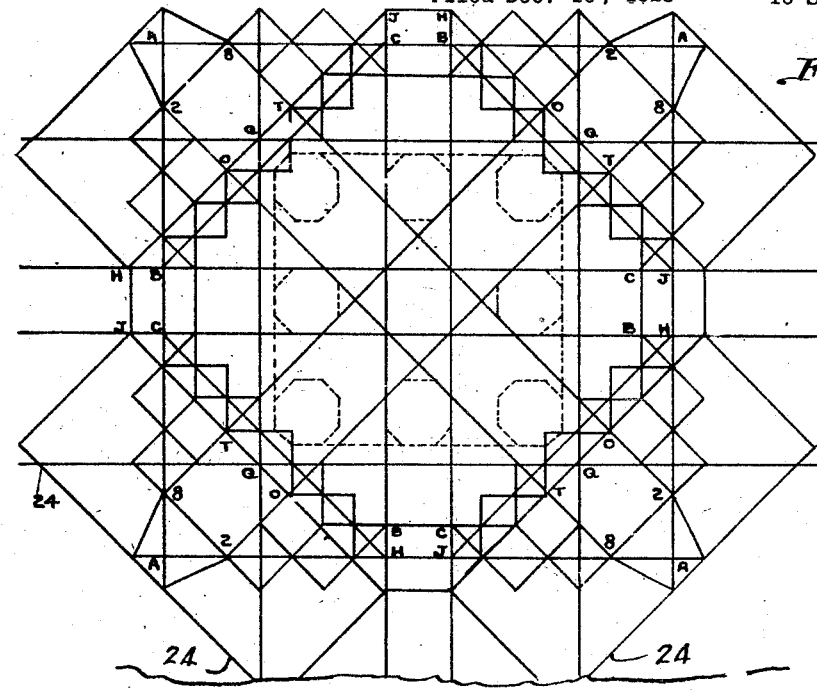
Figure 7:
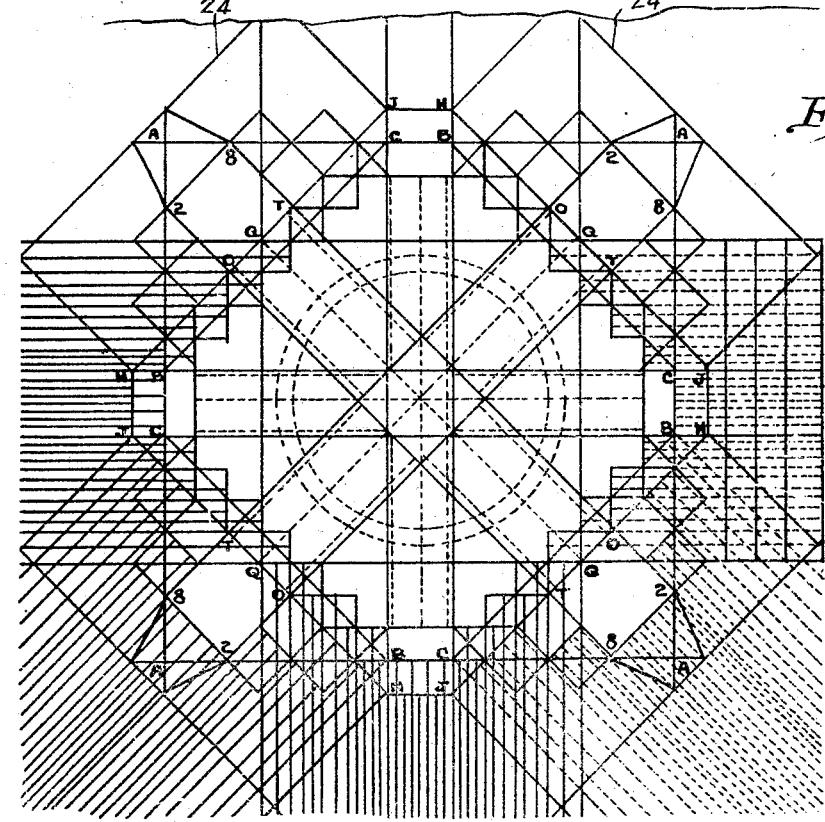
Figure 8:
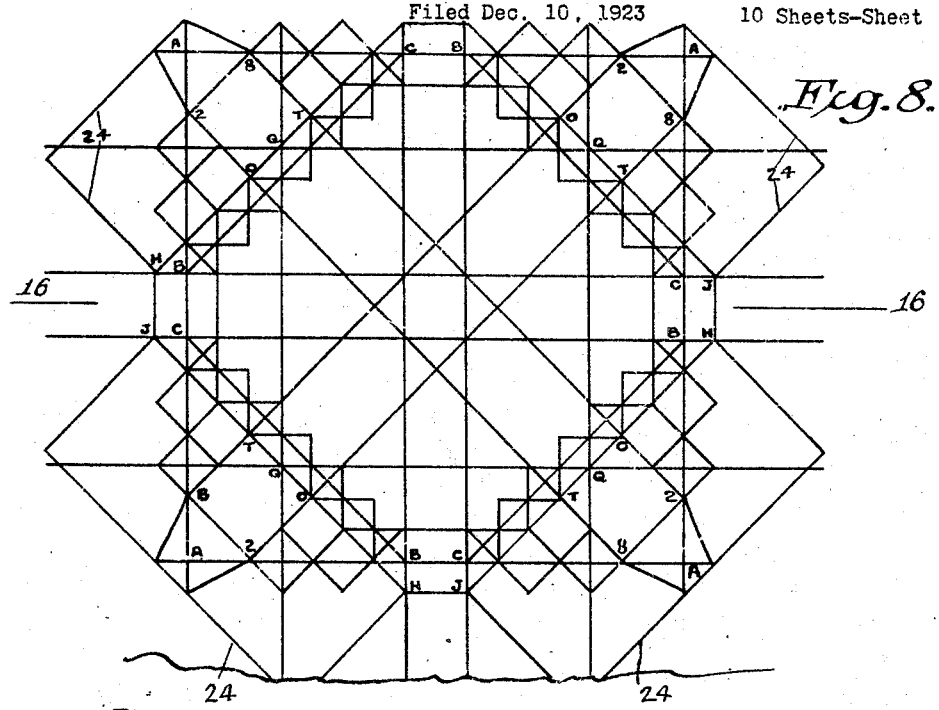
Figure 9:
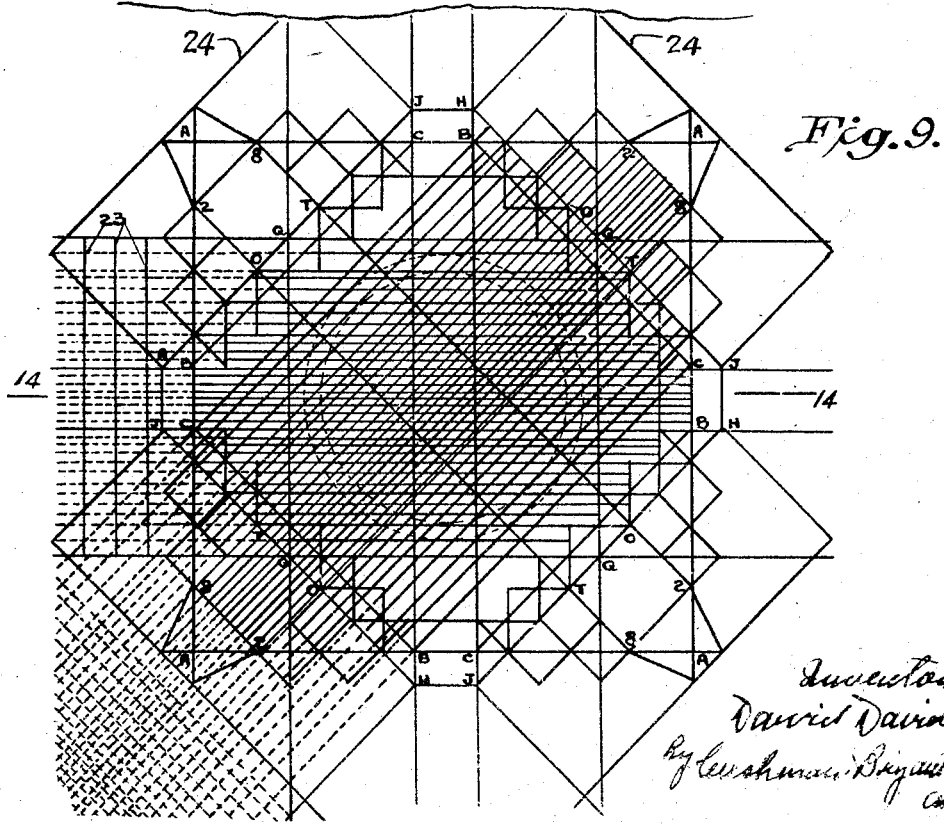
Figure 10:
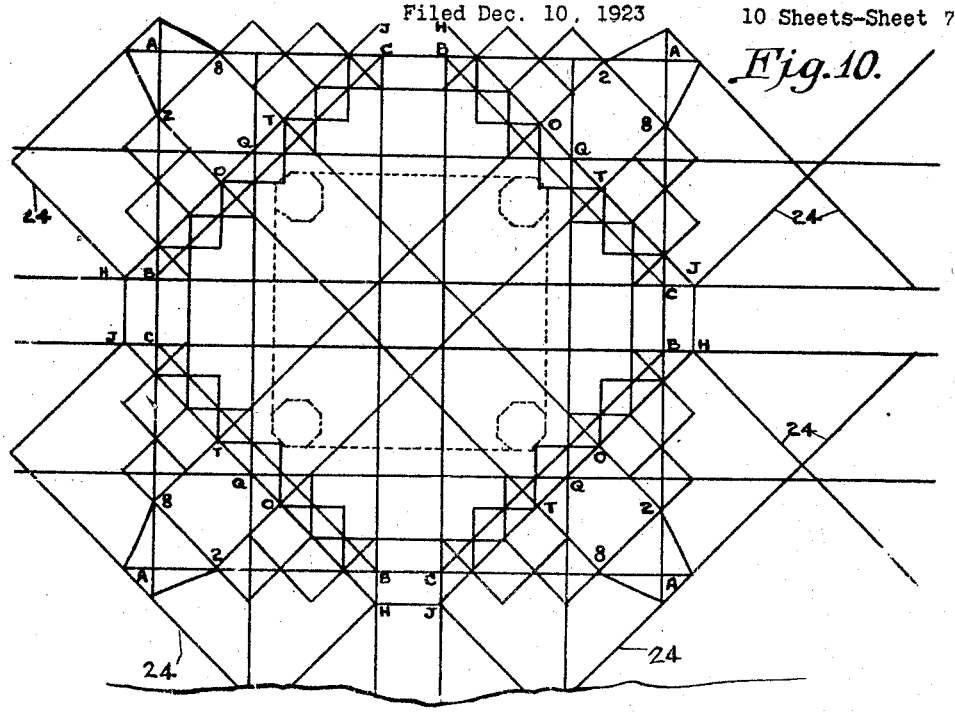
Figure 11:
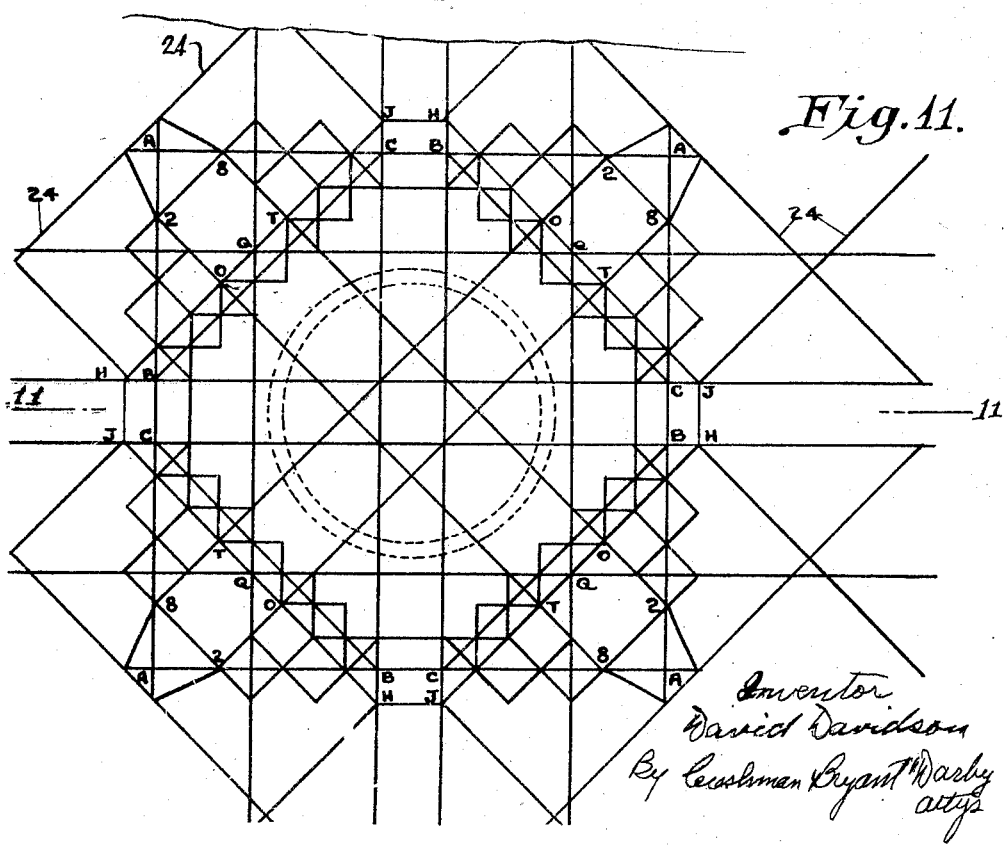
Figure 14:
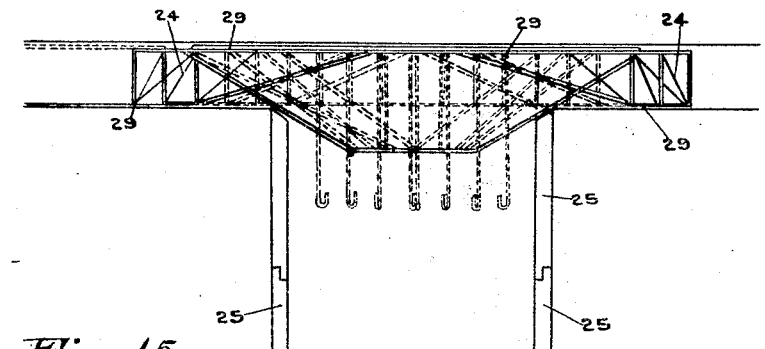
Figure 14 is a sectional view taken substantially along the line 14—14 of Figure 9.
Figure 15:
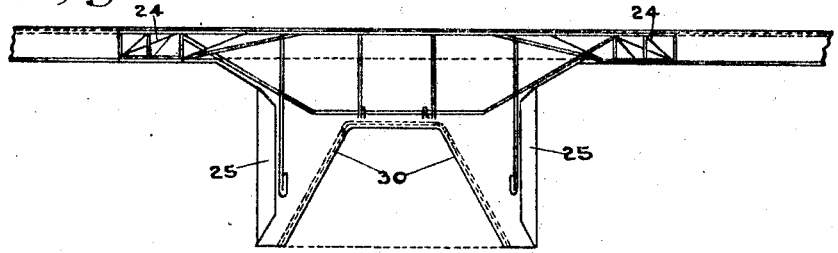
Figure 15 is a sectional view taken substantially along the line 15—15 of Figure 11.
Figure 16:
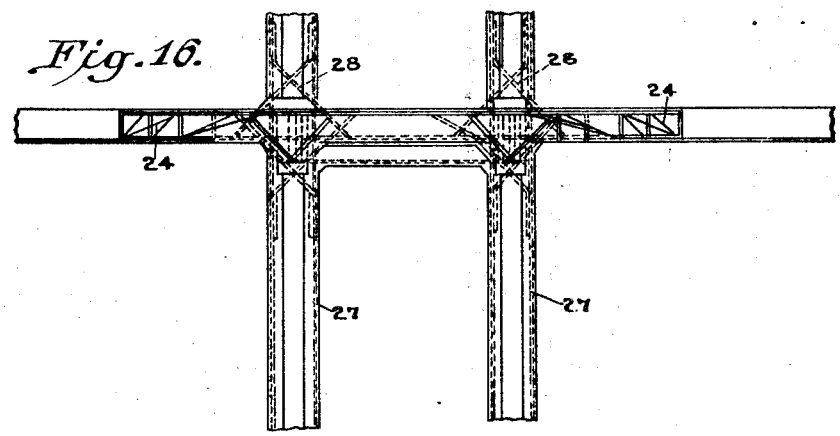
Figure 16 is a sectional view taken along the line 16—16 of Figure 8.
Figure 17:
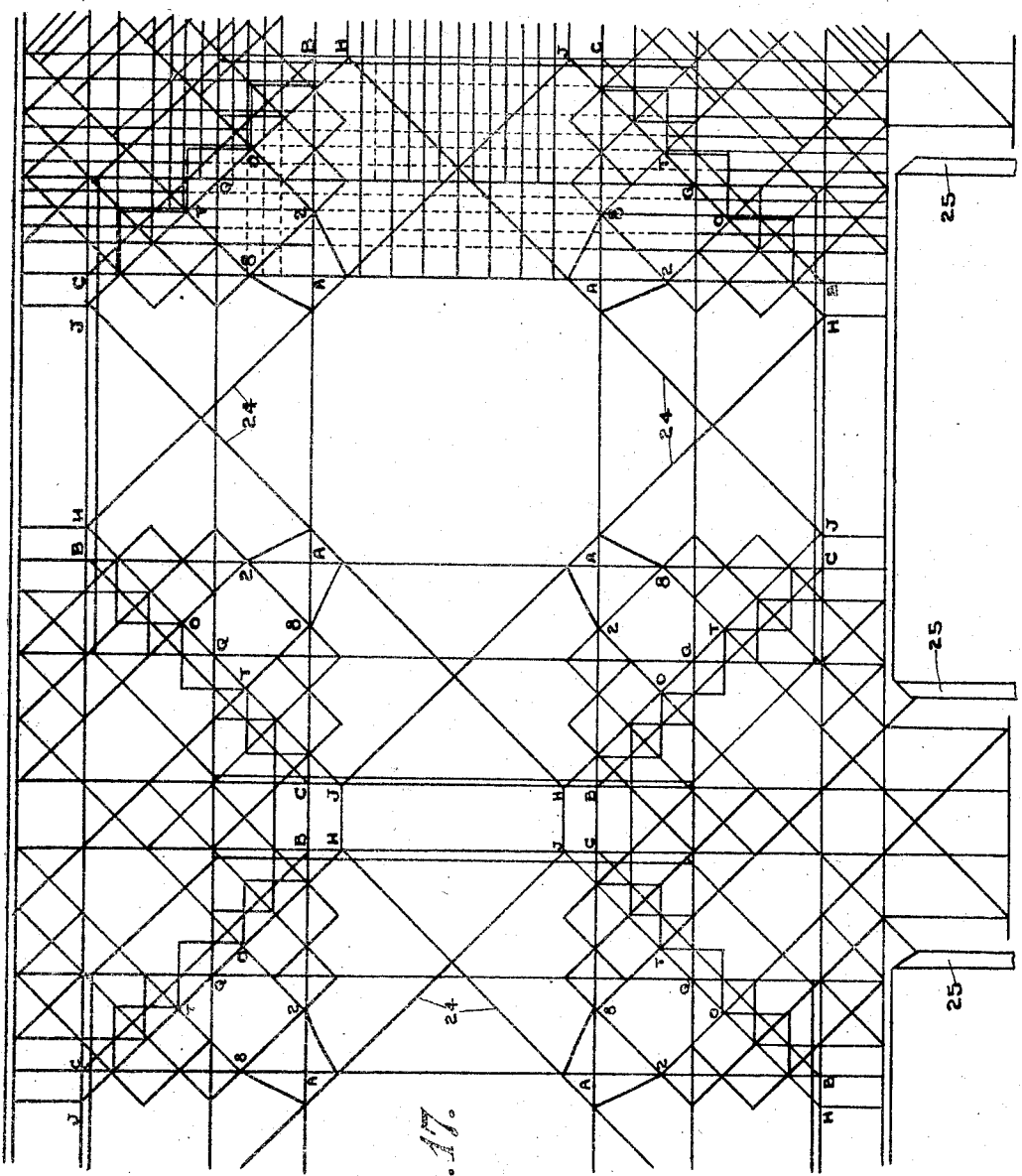
Figures 17 and 18 are diagrammatic plan views of other modified forms of the invention shown in Figure 4.
Figure 18:
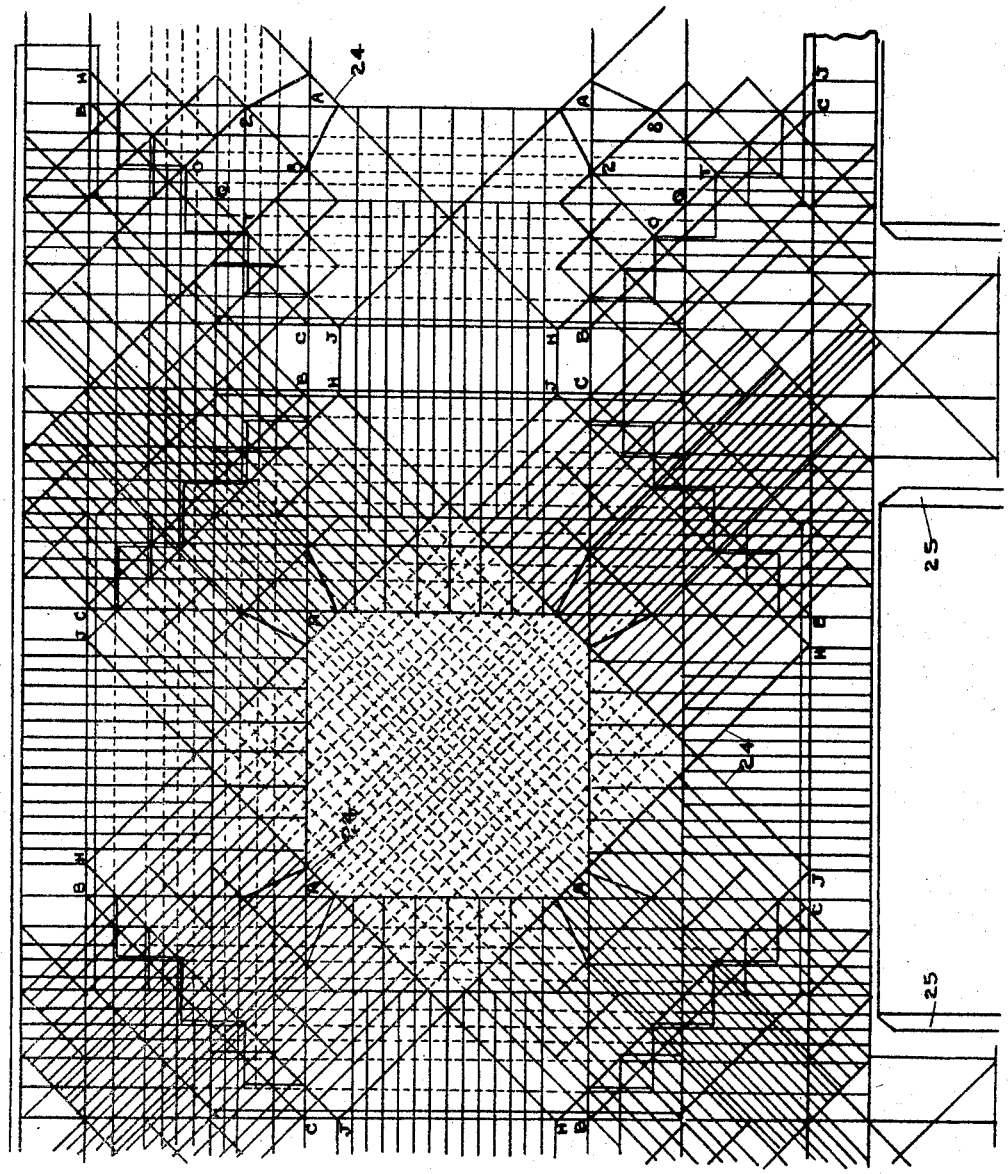

Referring to Figure 1 of the drawings 16, 17, 18 and 19, represent piers or their equivalent about which are the triangles indicated at 20. The strips or areas of reenforcement 21 are approximately equal to the diameter or width of the piers, and the width of each strip being not more than ten per cent greater than the diameter of the supporting pier. Four strips or areas of reenforcement span the shortest distances between the piers or supports as indicated by the lines 21, and two strips or areas of reenforcement span along the diagonals between the piers or supports as represented by the lines 22. The reenforcement strips or areas between the piers or supports overlap. The flexural strips or spans 21 possess equal loading and equal bending moments and shearing forces, whilst the diagonal flexural strips 22 also have equal loading and equal bending moments and shearing forces. The areas $a$, $b$, $c$, $d$, $e$ and $f$ indicate magnitude of loads so that the load on the flexural strips 21 and 22 may, when desired, be readily determined. Around each support there are eight positions of maximum end fixing bending moments. Hence interpolation of the eight maxima and integration give the total end fixing bending moment around the perimeter of the pier or support. In general it is found that little or no additional reenforcement to that provided by the central span bending moments, and continued to concentrate over support, is required over support, but, if necessary the end fixing frame may be built up from the unit truss frame. In all cases the corners of the central space area $a$, must lie on, or nearly on, the edges of the surrounding flexural strips 21. This means, generally that the distance between the centres of supports along a span must not exceed three times the width or diameter of the support along the same span, when the floor is not reenforced with beams. Where the floor is reenforced with beams, along the shortest distance between supports, and along the diagonals of supports, two parallel beams to a span, the above proportions may be increased to four or four and a half. With loading as thus defined the deflection at area $a$ and deflection at area $b$ are found. These give the calculated curve of flexure along areas $b$, $a$, $b$. From this can be determined the end-fixing bending moment at area $b$ and further the reenforcement necessary in the lateral wires 23 shown in (Figure 9). Owing to the bending moment at area $b$, in lateral end fixing, the deflection, and consequently the bending moment at area $a$, are slightly less than have been taken (which errs on the side of safety), and the central bending moment at area $b$, owing to the same effect, is slightly greater than taken. The slight increment of loading necessary to make correction for this is obtained from the curve of flexure of areas $b$, $a$, $b$, which by giving the difference between deflection at area $a$ and deflection at area $b$, supplies the resulting lateral deflection of areas or strips $b$, $a$, $b$. This, for the reasons noted, errs on the side of safety, and supplies a slightly greater increment of load laterally to area $b$, than is actually the case. In place of a pier or support of the proportions indicated, a reenforced concrete tower consisting of three, four or more legs may be used but in no case would it consist of a single ordinary reenforced concrete column of the slender proportions ordinarily used in reenforced concrete construction. The use of towers as defined enables large floor and ceiling areas to be provided without obstacles in the shape or columns. For example, the tower support such as 19, see Figure 1, may be the support of a system of radiating cantilever beams, like a Forth Bridge tower in eight directions, with beams bracketing out to carry the fixed slab areas $c$, $c$, $e$, $d$, and $f$, and possibly area $b$, to the centre of its span. The other towers would have similar cantilever systems, enabling slab area $a$ to be freely supported, and if necessary, slab area $b$ to be freely supported. This application would enable provision being made for expansion and contraction joints in large structures. The invention is not only applicable to square panels or slabs, but to any form of panel and slab, subjected to side pressure or floor panels carried by walls, beams, arches also to foundation rafts or floors carried on piers, cylinders, caissons or groups of piles, or in the case of raised floors of bridges, tanks or other building carried on wide piers, or wide towers consisting of three, four or more legs, and in both cases with or without beam arches or arched ribs or flat arches spanning diagonally or squarely between piers, towers or the like with or without cantilevers, and in ribs brackets or stiffeners radiating outwards from piers, towers or the like. In the application to the above system or method of a trussed frame nuclear unit, the basal framework of the upper and lower surfaces of the unit are respectively in the form of a triangle such as A, B, C, see Figures 2 and 3 and a rectangle 2, O, Q, T, 8 together with the parallel member H, J, parallel to B, C. The full lines in Figure 2 represent wires in the case of a light unit or centre lines of bars, rods or other class of description of structural member, in the case of a heavy unit, all lying in the plane forming the top horizontal surface of the unit as shown and in vertical planes forming the side surfaces shown nearest the point of observation adopted. Dash lines represent wires or centre lines of members of the unit, lying in the plane forming the under horizontal surface of the unit as shown and in vertical planes other than those shown nearest the point of observation adopted. Diagonal or cubic diagonal bracings wires or members or other strutting or shear reenforcement members may be added as required to satisfy requirements prior to during and after the process of reenforced concrete construction. The wires, rods, bars, or other member forming the unit may be jointed together at the ends, angles, bends, or other locations of contact, by means of welding, wiring together, interlocking of hooks or eyes, or other ordinary means of joining employed for such class and material of members. The framework of the unit permits of the rapid and economical rigid fixing and changing of direction at and about all points of contra-flexure in a panel or slab and of all tension and shear reenforcement of the panel or slab. The tensile reenforcement in the central areas of the panels or slabs may be a continuation of the tensile reenforcement over the end fixing supports of the panel or slab, the change of direction being effected by bending the reenforcement through and round the members of the framework in such a manner that the change of direction at and about the points of contra-flexure is effected without too great a concentration of change taking place in one section, or, alternatively, the tensile reenforcement in the central area of the panels or slabs, and between the regions including the line or lines of points of contra-flexure, may be independent, and fixed to the framework independent of the tensile reenforcement over the end fixing supports, in which case the shear reenforcement is also independent. In Figure 4 the unit trussed frames are shown as applied to end fixing framework of panel, constructed in situ and prior to setting of the tension and shear stirrup wires, bars or rods, the framework being indicated by the heavy lines at 24, there being, as shown, four unit trussed frames surrounding each pier or column. As shown in Figure 12, where the panel or floor or the like is supported by cylindrical caissons 25 in unstable ground the reenforcements of the floor or panel may be symmetrical top and bottom and bars or end fixing anchorage frames 26 may depend into the caissons 25, whilst additional shear stirrups 27 may be provided as and where necessary, the design and arrangement of reenforcement concrete structure, shown in Figure 12, being especially suitable for ground with no reliable bearing, or as reenforcement for foundations of buildings, tanks and the like where variable upward pressure from subsoil, water or springs is encountered. The system alternating with variations of downward pressure of the supported load is also applicable for clear span openings as in bridges, viaducts, water conduit, wharves or elevated railways. As shown, in Figure 14, reenforced concrete piles 27 constituting footings of towers may be used in lieu of the cylinder, piers or caissons 25 with internal beams 28 employed to connect or tie the heads of the piles 27. Figure 7 shows how the floor slab reenforcements 29 may be carried up and over end fixing anchorage frames 24. For light shallow piers or concrete filled cylinder foundations in semi-stable ground with no upward water pressure against the floor slabs, cone reenforcements 30, see Figure 17, may be utilized, the cylinder shell being circumferentially reenforced to resist outwardly spreading tendency due to the cones 30. The application of the unit trussed frames to the adjacent corners of four floor panels to form the basis of the reenforcement frame for the diaphragm, cap or base slab, bracing beams and stiffeners of a reenforced concrete tower is indicated in Figure 18. In the case of floor panels without beams this application depends upon the relationship that the floor span from centre to centre of towers does not exceed three times the over-all width of the tower.

Having thus described the invention what is claimed is:—

1. In a reenforced concrete structure of the class described, the combination of a series of spaced supports, trussed frame nuclear units external to each of the supports and positioned adjacent the sides thereof, and reenforcing means joining said units together.

2. In a reenforced concrete structure of the class described, the combination of a series of supports, substantially triangular trussed frame units external to each of the supports and positioned adjacent the sides thereof and reenforcing means connecting said units together.

3. In a reenforced concrete structure of the class described, the combination of a series of supports, substantially triangular trussed frame units external to each of the supports, and positioned adjacent the sides thereof, and reenforcing flexible strips connecting the units together.

4. In a reenforced concrete structure of the class described, the combination of a series of supports substantially triangular trussed frame units external to each of the supports and positioned adjacent the sides thereof, and reenforcing strips connecting the units together, said supports being of a width to contain and carry said strips.

5. In a reenforced concrete structure of the class described, the combination with a series of supports, the width of each support relative to the span between adjacent supports from center to center being substantially of the ratio of one to three, trussed frame units external to each of said supports and adjacent the sides thereof, and reenforcing wires connecting said units together.

6. In a reenforced concrete structure of the class described, the combination of a series of concrete floor slabs, substantially triangular nuclear units external to each of said slabs adjacent the sides thereof, and floor reenforcing wires connecting the units together whereby the wires can be tightened prior to the filling of the slabs with concrete.

7. In a reenforced concrete structure of the class described, the combination of a series of concrete floor slabs, nuclear units external to each of said slabs and adjacent the sides thereof, said units comprising a substantially quadrilateral frame work surrounded by a substantially triangular frame work, and flexible reenforcing means connecting said units together.

8. A trussed frame nuclear unit of the class described having a basal frame work of upper and lower surfaces, each of which surfaces consists of a triangle framework and an enclosed quadrilateral framework, and a member extending from one side of the quadrilateral parallel to the base of the triangle.

9. A trussed frame nuclear unit of the class described comprising a substantially rectangular framework and a substantially triangular framework surrounding and connected to said rectangular framework.

DAVID DAVIDSON.